(12) United States Patent
Wu

(10) Patent No.: US 8,368,955 B2
(45) Date of Patent: Feb. 5, 2013

(54) METHOD FOR ASSESSING SYNCHRONIZED PRINT DEFECTS

(75) Inventor: Wencheng Wu, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1027 days.

(21) Appl. No.: 12/334,761

(22) Filed: Dec. 15, 2008

(65) Prior Publication Data

US 2010/0149560 A1    Jun. 17, 2010

(51) Int. Cl.
*H04N 1/60* (2006.01)

(52) U.S. Cl. ......... 358/1.9; 358/463; 358/504; 358/518; 358/448

(58) Field of Classification Search .................. None
See application file for complete search history.

(56) References Cited

U.S. PATENT DOCUMENTS

| | | | |
|---|---|---|---|
| 6,100,999 A * | 8/2000 | Ikegami ..................... 358/1.9 |
| 6,275,600 B1 * | 8/2001 | Banker et al. ............... 382/112 |
| 6,606,395 B1 | 8/2003 | Rasmussen et al. |
| 6,665,425 B1 | 12/2003 | Sampath et al. |
| 7,069,164 B2 * | 6/2006 | Viturro et al. ................. 702/85 |
| 7,233,412 B2 * | 6/2007 | Siegeritz ..................... 358/1.9 |
| 7,239,819 B2 | 7/2007 | Gross et al. |
| 7,239,820 B2 | 7/2007 | Donaldson |
| 7,319,545 B2 * | 1/2008 | Linder et al. ................. 358/1.9 |
| 7,724,406 B2 * | 5/2010 | Wang et al. .................. 358/504 |
| 7,869,089 B2 * | 1/2011 | Horita ......................... 358/1.9 |
| 7,952,761 B2 * | 5/2011 | Paul et al. .................... 358/1.9 |
| 8,072,648 B2 * | 12/2011 | Monga et al. ............... 358/3.06 |
| 2003/0210414 A1 * | 11/2003 | Kuno .......................... 358/1.9 |
| 2005/0099446 A1 * | 5/2005 | Mizes et al. .................. 347/19 |
| 2006/0077488 A1 | 4/2006 | Zhang et al. |
| 2007/0070367 A1 * | 3/2007 | Keydar et al. ................ 358/1.9 |
| 2008/0013848 A1 * | 1/2008 | Wu et al. ..................... 382/254 |
| 2008/0137914 A1 | 6/2008 | Minhas |
| 2009/0273813 A1 * | 11/2009 | Viturro et al. ............... 358/3.26 |
| 2010/0188672 A1 * | 7/2010 | Bernal et al. ................ 358/1.9 |

* cited by examiner

*Primary Examiner* — Dung Tran
(74) *Attorney, Agent, or Firm* — Fay Sharpe LLP

(57) ABSTRACT

As set forth herein, a computer implemented method is used to detect synchronized defects in documents. Profiles of single separation test targets are characterized for one or more toner colors. A spatially varying toner reproduction curve (TRC) is constructed for each profile on terms of an area coverage in versus area coverage out. A profile is extrapolated for each color of interest and a CMYK profile is applied to obtain a correlating L*a*b* profile for each color of interest.

13 Claims, 6 Drawing Sheets

METHOD FOR ASSESSING SYNCHRONIZED PRINT DEFECTS

BACKGROUND

The present exemplary embodiments broadly relate to the detection of synchronized defects in printing systems. They find particular application with printing and measuring single separation test targets to extrapolate print appearance for disparate colors of interest. However, it is to be appreciated that the present exemplary embodiments are also amenable to other like applications.

Image non-uniformity occurs in the output images of digital image rendering devices, such as copiers, scanners, and printers, for a variety of reasons. Even relatively small non-uniformities can give rise to visibly objectionable print defects. Print quality can be tracked over time via inline and/or or offline sensing to react when output degrades beyond predetermined specifications. Conventionally, test pages are printed periodically to ascertain quality at any given point in time. Since every test page has an associated cost, however, existing approaches are often required to trade-off between a number of test colors of interest (sampling resolution in printer gamut) and how often such colors are printed and assessed (sampling resolution in time). These trade-offs are also often constrained by many factors such as inline vs. offline, paper and/or toner consumption, IQ measurement cost, productivity interruption, etc.

In printing systems, physical alignments, component tolerances, wear and component age can influence the uniformity with which colorants, such as inks and toners, are laid down across the surface of print media. Due to the characteristics of print operations, some defects are synchronized while others are not. Streaks are classic examples of synchronized defects where the locations of light streaks are the same from one page to another. Streaks are one-dimensional image defects that generally run parallel to the process direction in the printed image. Banding on the other hand, is generally a non-synchronized defect wherein the locations of light and dark repeated bands may vary from one page to another due to phases. Bands are one-dimensional image defects that generally run perpendicular to the process direction in a printed image. In some instances, however, banding defects can be synchronized when they always start at a particular phase due to the synchronization mechanism, such as page-sync, in some products.

Streaks can arise from non-uniform responses of the subsystems of an image rendering device, such as a xerographic marking engine, and can be constant over time in that they appear in relatively the same location from print to print. Photoreceptor scratches, contamination of the charger wire, non-uniform LED imager output and Raster Output Scanner (ROS) spot size variations, and spatially varying pressure on a bias transfer roll are examples of subsystem defects which can give rise to rendered image streaking in a xerographic marking engine.

Various methods exist for correcting image quality defects, once they are detected. These include modification of the tone reproduction curves (TRCs) used in converting the original image data into machine-dependent image data. Automated systems have been developed for compensating for non-linearity's introduced by an individual image rendering device. However, even with such techniques available, image rendering devices can produce images which have noticeable defects. When a print job is to be printed, a customer may test print several pages to ensure that the device chosen for rendering is performing satisfactorily. This process can be time consuming and also wastes supplies if the customer decides to check several image rendering devices before printing the job.

What are needed are methods to efficiently identify synchronized defects without negatively affecting throughput of a given device.

BRIEF DESCRIPTION

In one aspect, a computer implemented method is used to detect synchronized defects in documents. Profiles of single separation test targets are characterized for one or more toner colors. A spatially varying toner reproduction curve (TRC) is constructed for each profile on terms of an area coverage in versus area coverage out. A profile is extrapolated for each color of interest and a CMYK profile is applied to obtain a corresponding L*a*b* profile for each color of interest.

In another aspect, a computer implemented method evaluates synchronized defects. Streak targets are printed for each toner color utilized by a print engine for area coverage. The streak targets are measured to obtain their streak profiles and spatially varying TRCs are constructed in terms of AC in versus AC out. The streak profiles are extrapolating for each color of interest; and the quality of streaks for colors of interest are assessed by applying an IQ assessment engine.

In yet another aspect, a computer implemented method assesses quality of synchronized print defects. Spatial information of the defects is characterized in detail via single separation test targets. Spatial profiles for each color of interest are extrapolated and quality of defects are assessed across a full printer gamut using color information of a nominal printer model based at least in part upon the spatial profile extrapolation.

DETAILED DESCRIPTION

Figure 1:
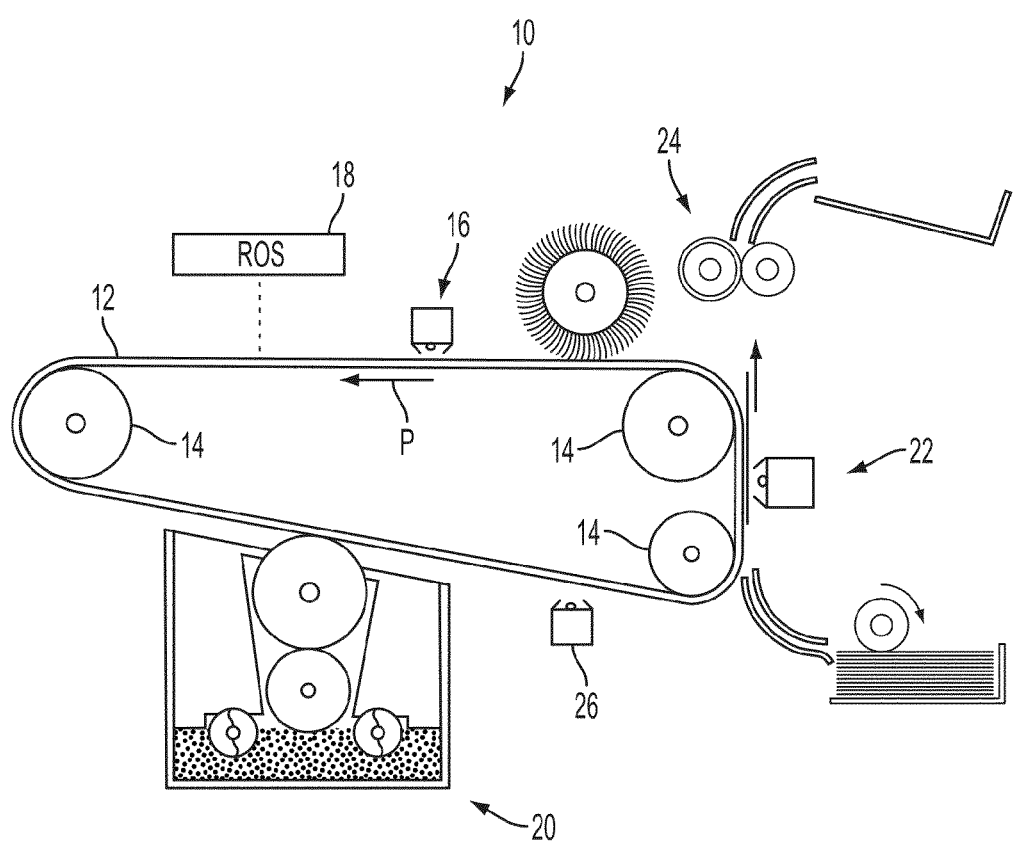
FIG. 1 illustrates a schematic of an electro photographic print system, in accordance with an exemplary embodiment.

FIG. 1 is a schematic representation of an electrophotographic printing system 10 that is suitable for incorporating the subject embodiments. The printing system 10 includes a photoreceptor 12 which may be in the form of a belt or drum and which comprises a charge retention surface. In this embodiment, photoreceptor 12 is entrained on a set of rollers 14 and caused to move in a counter-clockwise process direction by means such as a motor (not shown).

The first step in an electrophotographic process is the charging of the relevant photoreceptor surface. This initial charging is performed by a charge source 16. The charged portions of the photoreceptor 12 are then selectively discharged in a configuration corresponding to the desired image to be printed by a raster output scanner (ROS) 18. The ROS 18 generally comprises a laser source (not shown) and a rotatable mirror (also not shown) acting together in a manner known in the art to discharge certain areas of the charged photoreceptor 12. Although a laser source is shown in the exemplary embodiment, other systems that can be used for this purpose include, for example, an LED bar or a light lens system. The laser source is modulated in accordance with digital image data fed into it and the rotating mirror causes the modulated beam from the laser source to move in a fast scan direction perpendicular to the process direction of the photoreceptor 12. The laser source outputs a laser beam of sufficient power to charge or discharge the exposed surface on photoreceptor 12 in accordance with a specific machine design.

After selected areas of the photoreceptor 12 are discharged by the laser source, remaining charged areas are developed by a developer unit 20 causing a supply of dry toner to contact the surface of photoreceptor 12. In one embodiment, the developer unit 20 utilizes a four-color system that includes cyan (C), magenta (M), yellow (Y), and black (K) toner. The developed image is then advanced by the motion of photoreceptor 12 to a transfer station including a transfer device 22, causing the toner adhering to the photoreceptor 12 to be electrically transferred to a substrate, which is typically a sheet of paper, to form the image thereon. The sheet of paper with the toner image thereon is then passed through a fuser 24, causing the toner to melt or fuse into the sheet of paper to create a permanent image.

One way in which print quality can be quantified is by measurement of the halftone area density, (i.e., the copy quality of a representative area), which is intended to be, for example, fifty percent covered with toner. The halftone is typically created by virtue of a dot screen of a particular resolution and, although the nature of such a screen will have a great effect on the absolute appearance of the halftone, any common halftone may be used. Both the solid area and halftone density may be readily measured by optical sensing systems that are familiar in the art.

A densitometer 26 is used after the developing step to measure the optical density of the halftone density test patch created on the photoreceptor 12 in a manner known in the art. As used herein, the work "densitometer" is intended to apply to any device for determining the density of print material on a surface, such as a visible light densitometer, an infrared densitometer, an electrostatic volt meter, or any other such device which makes a physical measurement from which the density of print material may be determined.

Figure 2:
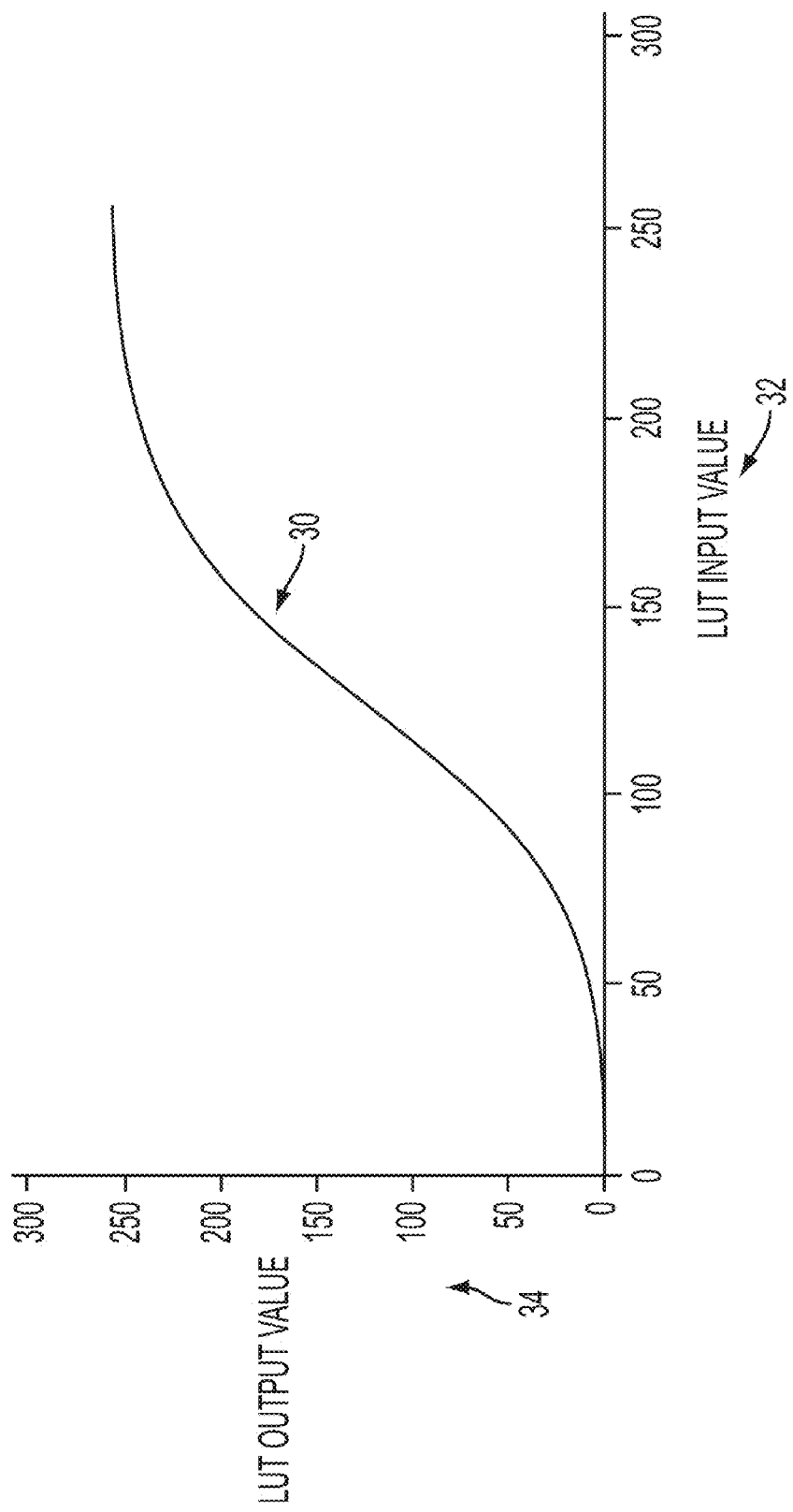
FIG. 2 is a graph of a toner reproduction curve in the form of a look-up table, in accordance with an exemplary embodiment.

Typically, when the laser source causes spots of a certain size to be deposited, the spots become somewhat enlarged when developed. Theoretically, if the spots were able to be developed at exactly the same size as the deposited spots, then perfect size reproduction would be possible, wherein a tone reproduction curve (TRC) would be a straight line. However, because of the undesirable spot enlargement, the TRC takes on the form of a curve, one example of which is shown in FIG. 2, in order to produce the desired output density. In order to maintain a TRC at its desired configuration, voltage levels within printing system 10 can be changed in order to produce a desirable TRC. For example, mag bias, charge level and laser power can be modified in order to maintain a desired curve.

FIG. 2 provides a visual representation of a TRC 30 implemented in the form of a lookup table (LUT). In this exemplary implementation, an input C, M, Y or K value is found on the horizontal LUT input value axis 32. A vertical line from the determined position on the horizontal axis intersects the TRC curve 30 at a point that determines the LUT output value 34 in terms of C, M, Y or K as read from the vertical axis. Utilizing the aforementioned controls for mag bias, charge level and laser power to stabilize the TRC provides reasonable results but with some variation.

Figure 3:
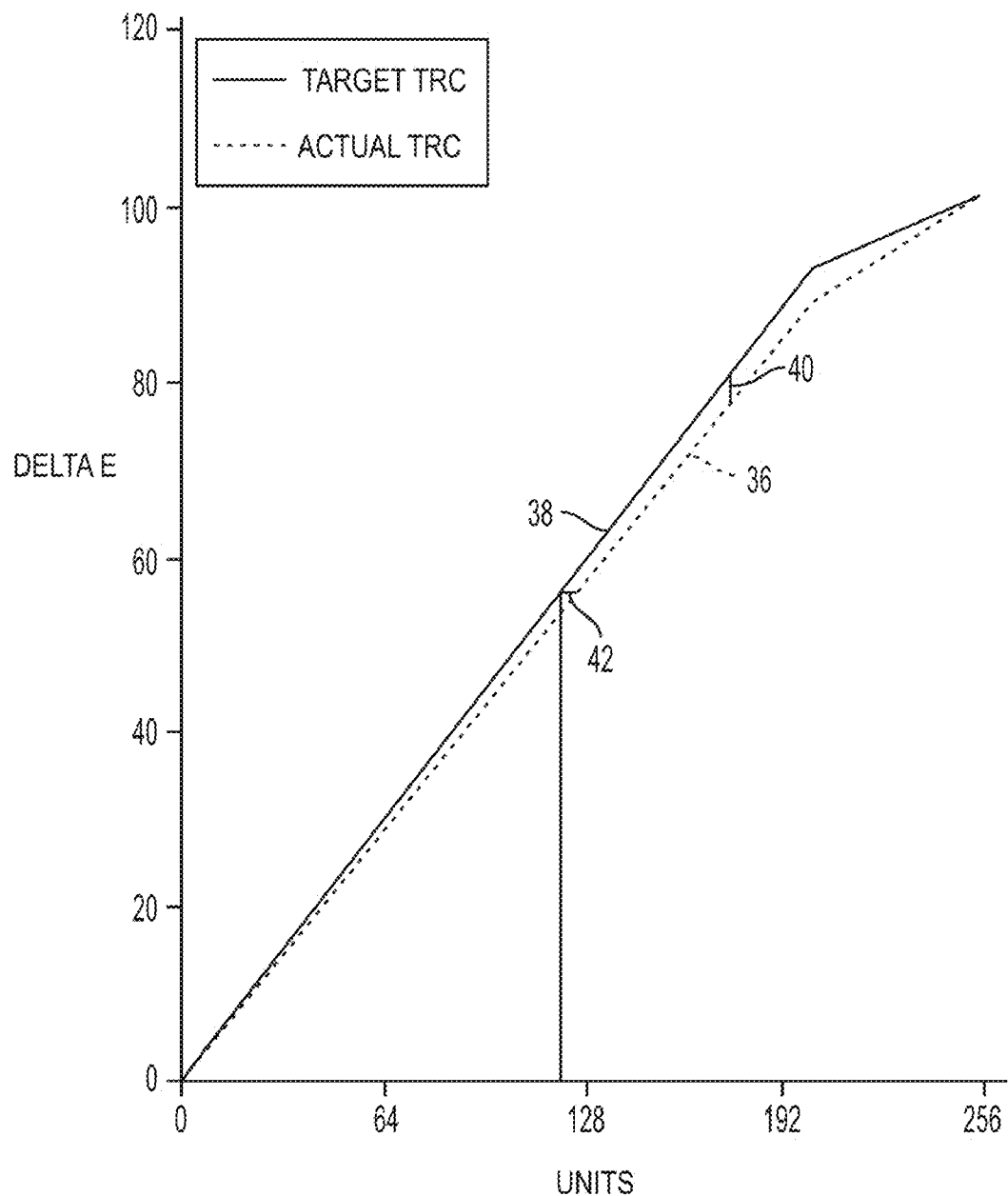
FIG. 3 is a graph of variation of a target reproduction curve from an actual TRC to target TRC, in accordance with an exemplary embodiment.

FIG. 3 illustrates TRC variation from the target TRC, due to error caused by dead band control at the midpoint and a method for reducing Delta-E error caused by dead band control. Actual TRC 36 varies from target TRC 38 by an amount characterized as Delta-E and shown as numeral 40. This error can be compensated for by printing a halftone density that is adjusted from the desired halftone density by a correction amount 42 such that the developed halftone density matches the requested halftone density. In one example, an image might require a halftone density of 128 units, where units are any measure related to the density. Reducing the requested 128 units by the correction factor 42 (6 units) and printing a 122 unit density, can result in a developed halftone equal to the original requested 128 bit halftone.

Figure 4:
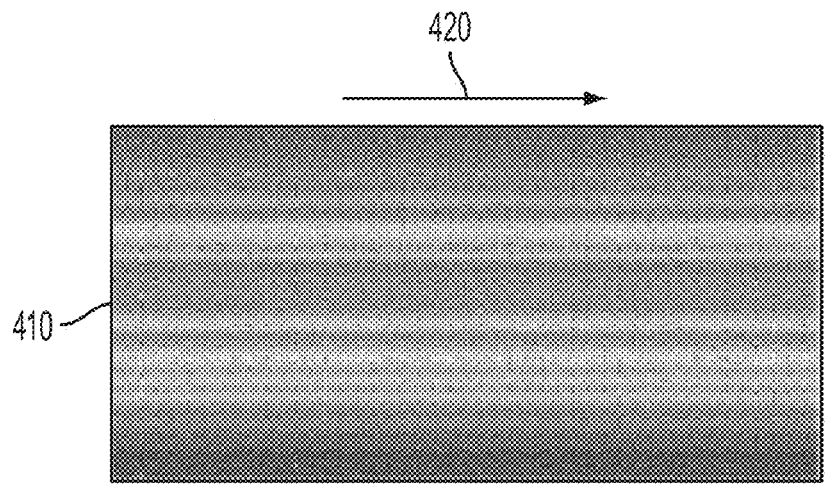
FIG. 4 illustrates an image patch that shows TRC variations, in accordance with an exemplary embodiment.

FIG. 4 is an image patch 410 that illustrates TRC variation. The image patch 410 has a single gray level value that contains a number of streak defects 420 that run parallel to a process direction. Each streak defect extends along a process or slow-scan direction, while the various different streak defects are adjacent to each other along the cross-process or fast-scan direction. In one example, the magnitude of the streaking or the difference in toner intensity is a function of cross process position. All pixels in a column that are parallel to the process direction and that are a given distance from a reference location can experience a same shift in intensity due to the streak defect.

In various exemplary embodiments of the invention described herein as systems and methods, streaks or improper toner density regions that run the length of the process direction in a document and have a constant lighter or darker intensity than adjacent regions of the same intended intensity are compensated for prior to actual printing of the document. Streaking can be referred to as a synchronized print defect as it is found in substantially the same location from page-to-page. Synchronized defects have a unique characteristic as spatial and color information is separable. The streak locations are the same and the amplitudes in L*a*b* space are different due to the difference in color of interest since streak amplitudes are modulated by colors. Accordingly, single separation test targets can be printed and measured, wherein disparate color curves can be ascertained via extrapolation.

Figure 5:
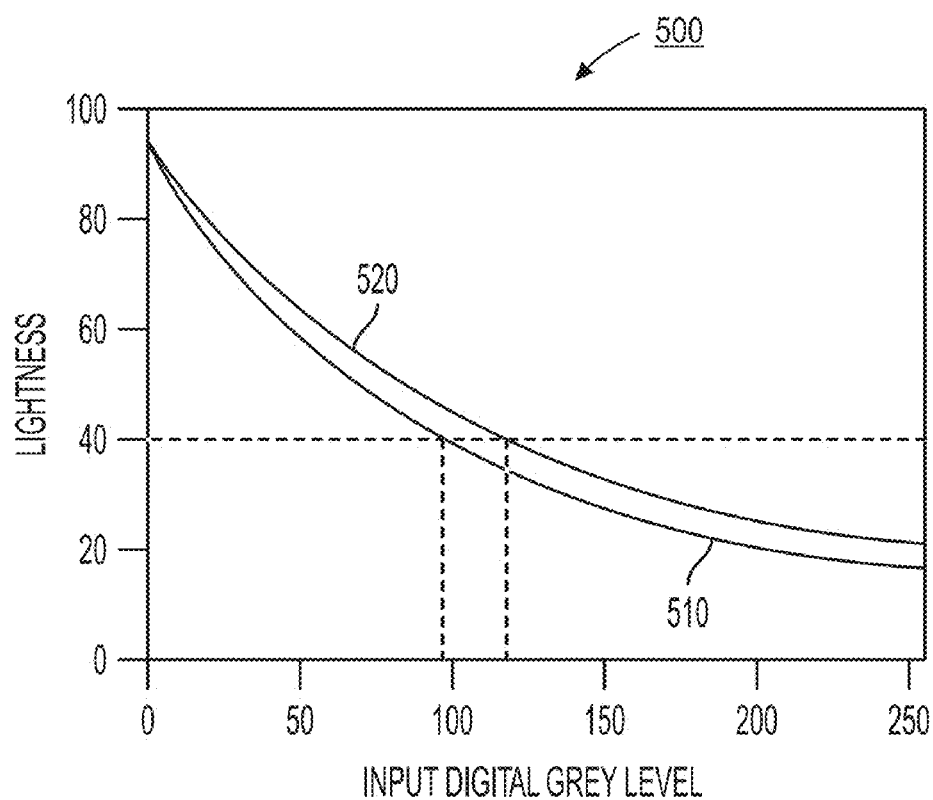
FIG. 5 illustrates a graph that two curves that represent lightness as a function of input gray level, in accordance with an exemplary embodiment.

FIG. 5 is a graph 500 of two curves that show lightness, a measure of the printed toner density, as a function of input gray level. The ideal or intended TRC 520 indicates the output lightness as a function of input gray level in all pixel columns if no streak defects are present. The actual TRC 510 is an example of actual output lightness as a function of input gray level for a pixel column which experiences a streak defect. If the printer response at this pixel column were accurate, the plot of the actual gray level versus input level would match the plot of the ideal or intended TRC 520 at all positions. Deviations of this local TRC 510 from the ideal or intended TRC 520 quantify the degree of streaking for this pixel location at all gray levels.

In this example, based on the ideal TRC 520, an image portion having an actual gray level output of 40 is desired. Under ideal conditions, to obtain the desired actual gray level output at this pixel location, a xerographic or electrographic image forming system would need to print that image portion using an input gray level of 117. Based on the actual TRC 510, if the image portion having a gray level output of 40 is desired the input level 117 is used, actual printed gray level would be 36, which is in error with respect to the intended level. To achieve a uniform lightness of 40 the input gray level value for the pixel location experiencing the streak defect must be lowered to a value 97 from the value 117, which can be determined from the actual TRC at the streak location and the ideal TRC. In this manner, the modification of all digital input gray level as can be performed by comparing the ideal TRC 520 to the actual TRC 510 throughout the print gamut.

In one implementation of a uniformity compensating TRC, the input gray level is adjusted for each pixel by modifying the input gray level for that pixel by a compensation matrix or LUT. The compensated gray level is selected depending on the exact pixel location and the input level. The uniformity compensating tone reproduction curve is then applied to the input image or gray level value to convert from the input gray level value to a modified uniformity corrected printer dependant gray level value. Consider the application of this uniformity compensating process an 11" page, having 600 spots/inch (spi), with the goal of streak compensation, 6600 of the above RCs would need to be stored and applied. Hence, to apply this uniformity compensation method across a broad spatial extent, across multiple engines, or, in general, across a desired space of uniformity, it can be appreciated that systems costs, such as computations, memory and time, can be excessive.

Spatial information related to such synchronized defects can be characterized via single separation test targets (e.g., for each color C, M, Y, and K) characterized by spatially varying TRCs. The quality of defects can then be extrapolated across a full printer gamut using the color information of a "nominal" printer model, such as an ICC profile. Once identified, the defects can be corrected via an LUT or other means. In this manner, greater operation efficiency can be realized, as synchronized print defects are characterized utilizing much less test pages than conventional methods. It is to be appreciated that the systems and methods described herein are suitable for any synchronized print defect, such as streaking and particular instances of banding, for example.

Figure 6:
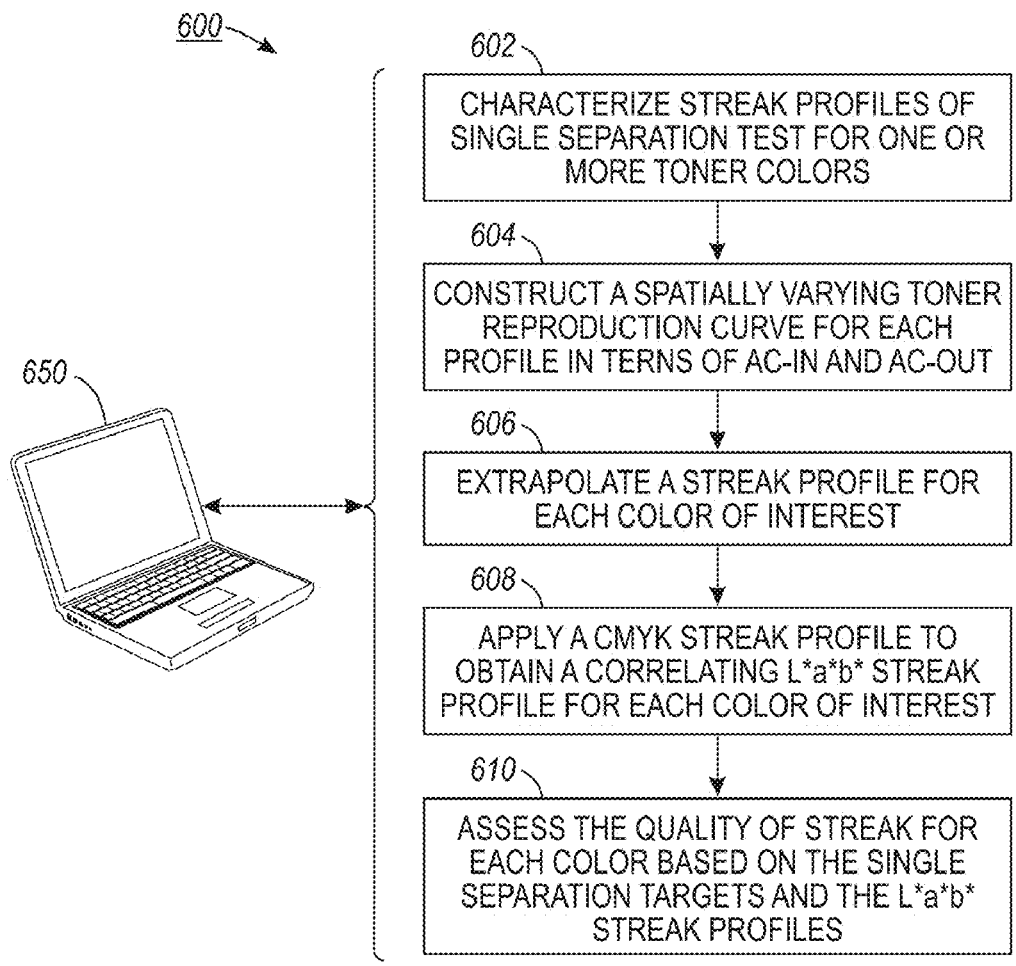
FIG. 6 illustrates a method to assess quality of streaks based on an extrapolated streak profile, in accordance with an exemplary embodiment.

FIG. 6 illustrates a method 600 to assess print defects associated with streaking. As discussed herein, print defect assessment can occur in substantially any context. In one example, image quality is continuously monitored to provide quality assurance, to create a preventive maintenance scheduled and/or to verify that a particular quality standard (e.g., six sigma) is met. In a second example, defect assessment measure synchronized image quality of a printer for the purpose of diagnostics and/or benchmarking competitor's printers (e.g., for page costs, etc.) as set forth in U.S. Pat. Nos. 6,606,395 and 6,665,425, incorporated by reference herein.

At reference numeral 602, streak profiles of single separation test targets are characterized for one or more toner colors utilized in a particular print device. Streak targets are printed at $n_i$ area-coverage (AC), wherein i=c, m, y, k for each separation. The streak targets are measured to obtain streak profiles associated with each color (e.g., in L*a*b* or Delta-E to paper) such that spatial TRCs are presented in terms of AC vs. Delta-E to paper.

At 604, spatially varying TRCs are constructed in terms of AC-in vs. AC-out by comparing the above TRCs of AC vs. Delta-E to paper to the reference TRC derived from the nominal printer model. In one example, steps 602 and 604 are similar to calibration steps described in US Patent Publication No. 2006/0077488, incorporated in its entirety herein, with regard to streak compensation. The main differences are 1) the spatial varying TRCs are the inverse of curves described herein for compensating streak and 2) the reference TRC is for the average TRCs rather than one derived from the nominal printer model.

At 606, streaks profiles of colors of interest are extrapolated. For a given color of interest $(c_0, m_0, y_0, k_0)$, the spatial TRC is applied to $(c_0, m_0, y_0, k_0)$ to get the streak profiles of the given color in terms of spatially varying cmyk values. If no cyan streaks are found in step 602, the cyan sTRC will be the same for all spatial locations. In such case, the cmyk streak profiles will have a constant c value. Similarly, if there are no streaks in single separations for myk, then the cmyk streak profiles here will have a constant myk as well. Such a result illustrates that the method is accurate in a null case where no streaks are detected in single separations. At 608, a nominal printer model, cmyk→Lab, is applied to correlating cmyk streak profiles to get the L*a*b* streak profiles for the given colors of interest $(c_0, m_0, y_0, k_0)$).

At 610, the quality of streak for each color of interest is assessed by applying an image quality (IQ) assessment engine (e.g., such as Xerox Corporation's IQAF) via inputting the measured (for single separation targets in 602 and 604) and extrapolated (for other colors of interest in 606 and 608) L*a*b* streak profiles. In one approach, quality can be related to a linear regression fit to a predetermined standard. In this manner, an efficient IQ assessment of synchronized defects is performed. Step 610 is not always necessary as human perception has different frequency sensitivities in L*, a*, b*. Thus, it is quite likely that the worst streak prints is not a single separation print. Therefore, the method 600 can be used to identify the worst color for streaks without measuring a dense sampling of test pages covering all colors of interest.

The systems and methods described herein can also be used for defect soft-proofing as described in US Patent Publication No. 2008/0137914, incorporated in its entirety herein, as an efficient method to characterize and simulate soft-proof streak defects to digital originals of customer pages. Although sTRC's are employed in this embodiment to characterize spatial information, other methods can be used as well. For instance, for printers that exhibit spatial color interaction (re-transfer) and/or gloss non-uniformity at high AC, a combination of sTRC (focus on monochrome, high spatial resolution) and sDLUT (spatially varying multi-dimensional LUT, focus on high AC color interaction and lower spatial resolution) can be employed. Alternatively or in addition, this approach can be used for assessing synchronized banding such as: photoreceptor once-around (PR1X) non-uniformity of DC8000, in a similar fashion. In such a case, a step is added to extract out only the PR1X non-uniformity component (e.g., synchronized component) in characterizing single separation test pages.

A computer 650 illustrates one possible hardware configuration to support the systems and methods described herein, including the method 600 above. It is to be appreciated that although a standalone architecture is illustrated, that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiment.

The computer 650 can include a processing unit (not shown), a system memory (not shown), and a system bus (not shown) that couples various system components including the system memory to the processing unit. The processing unit can be any of various commercially available processors. Dual microprocessors and other multi-processor architectures also can be used as the processing unit.

The system bus can be any of several types of bus structure including a memory bus or memory controller, a peripheral bus, and a local bus using any of a variety of commercially available bus architectures. The computer memory includes read only memory (ROM) and random access memory (RAM). A basic input/output system (BIOS), containing the basic routines that help to transfer information between elements within the computer, such as during start-up, is stored in ROM.

The computer 650 can further include a hard disk drive, a magnetic disk drive, e.g., to read from or write to a removable disk, and an optical disk drive, e.g., for reading a CD-ROM disk or to read from or write to other optical media. The computer 650 typically includes at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above can also be included within the scope of computer readable media.

A number of program modules may be stored in the drives and RAM, including an operating system, one or more application programs, other program modules, and program non-interrupt data. The operating system in the computer 650 can be any of a number of commercially available operating systems.

A user may enter commands and information into the computer through a keyboard (not shown) and a pointing device (not shown), such as a mouse. Other input devices (not shown) may include a microphone, an IR remote control, a joystick, a game pad, a satellite dish, a scanner, or the like. These and other input devices are often connected to the processing unit through a serial port interface (not shown) that is coupled to the system bus, but may be connected by other interfaces, such as a parallel port, a game port, a universal serial bus ("USB"), an IR interface, etc.

A monitor, or other type of display device, is also connected to the system bus via an interface, such as a video adapter (not shown). In addition to the monitor, a computer typically includes other peripheral output devices (not shown), such as speakers, printers etc. The monitor can be employed with the computer 650 to present data that is electronically received from one or more disparate sources. For example, the monitor can be an LCD, plasma, CRT, etc. type that presents data electronically. Alternatively or in addition, the monitor can display received data in a hard copy format such as a printer, facsimile, plotter etc. The monitor can present data in any color and can receive data from the computer 650 via any wireless or hard wire protocol and/or standard.

The computer 650 can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

Figure 7:
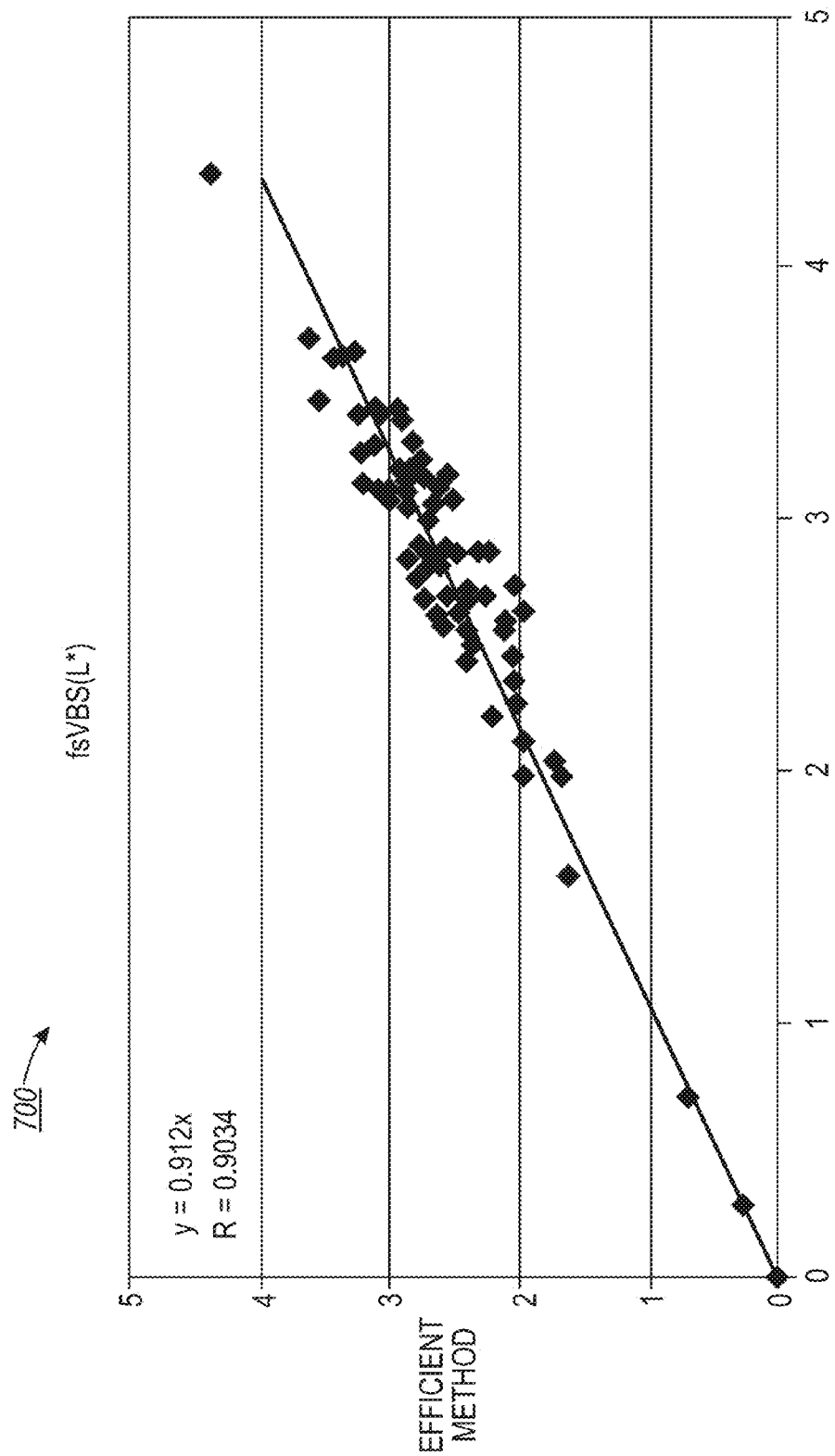
FIG. 7 illustrates a comparison of streak results using an actual IQ assessment versus an extrapolated streak performance, in accordance with an exemplary embodiment.

FIG. 7 is a chart 700 that illustrates a comparison of streak results using an actual IQ assessment on each page versus an extrapolated streak performance. In this example, eighty-five pages were printed and each one was assessed using a standard IQ approach. These eighty-five measurements are designated as diamonds on the chart 700. A fraction (seventeen) of the eighty-five pages were characterized via spatial information with single-separation prints and an offline derived printer model. The method 600 was utilized to measure the seventeen single separation test pages, wherein, the streak performance is assessed in term of a particular Xerox internal IQ standard (e.g., fsVBS, Visual Band and Streak, etc.) of all eighty-five test pages accurately. Some residual errors may be due to (1) inaccuracy in the printer model (2) repeatability limits of scanner (3) printer instability. The $R^2$ is about 0.90 with slope 0.91, which is about 9% underestimated compared to the actual value. It is to be appreciated that similar results can be obtained utilizing the systems and methods set forth herein.

In this example, the saving of printing and measuring is 85 to 17. In practice, an optimal gray-level strategy can be used to determine numbers of single separation test pages that can sufficiently characterize the spatial information of single separations, e.g. sTRC's, for a given printer. With that and the method described herein, it is sufficiently accurate to characterize the synchronized defects for larger/full printer gamut (up to $256^4$ colors). Hence, the potential saving could be as high as from $256^4$ to $4 \times 256$ (or less depending on the optimal number of single separation gray levels).

The exemplary embodiments have been described with reference to the preferred embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A computer implemented method to detect synchronized defects in documents, the method comprising:
   characterizing profiles of single separation test targets for one or more toner colors;
   constructing a spatially varying toner reproduction curve (TRC) for each profile in terms of an area coverage in versus area coverage out by using the characterized profiles;
   using a processor, extrapolating a CMYK profile based on applying the TRC to each color of interest without printing targets for each color; and
   correlating the CMYK profile to a corresponding L*a*b* profile for each color of interest.

2. The method of claim 1, further including:
   assessing the quality of streak for each color based on the single separation targets and the L*a*b* profiles to identify one or more defects associated with each print page.

3. The method of claim 1, wherein the synchronized defect is one of streaking and banding.

4. The method of claim 2, wherein quality of defects are assessed across a full printer gamut utilizing color information of a predetermined printer model.

5. The method of claim 1, wherein each profile is associated with a single toner color.

6. The method of claim 1, wherein profiles are characterized by printing targets for each toner color and by measuring the targets to obtain the respective profiles and one or more of L*a*b* or Delta-E to paper, wherein Delta-E to paper is a color difference calculated between a printed part and a non-printed part of the target.

7. The method of claim 6, wherein the targets are measured to provide a spatial TRC in terms of area coverage versus Delta-E to paper.

8. The method of claim 1, wherein a reference TRC is an average of the toner reproduction curves for each respective toner color.

9. The method of claim 1, wherein if no cyan streaks are identified the cyan spatially varying toner reproduction curve is the same for all spatial locations.

10. The method of claim 1, wherein if there are no streaks in single separation for magenta, yellow and black, the CMYK streak profile will have a constant magenta, yellow and black value.

11. The method of claim 1, wherein a nominal printer model is applied to the CMYK profiles to obtain L*a*b* streak profiles for each respective toner color.

12. The method of claim 11, wherein the nominal printer model is a conversion from CMYK to L*a*b*.

13. The method of claim 1, wherein the quality of streaks for each color is assessed via an IQ assessment engine by inputting measured and extrapolated streak profiles to the assessment engine.

* * * * *